United States Patent
Strock et al.

(10) Patent No.: US 11,073,028 B2
(45) Date of Patent: Jul. 27, 2021

(54) TURBINE ABRASIVE BLADE TIPS WITH IMPROVED RESISTANCE TO OXIDATION

(71) Applicant: United Technologies Corporation, Farmington, CT (US)

(72) Inventors: Christopher W. Strock, Kennebunk, ME (US); Kevin Seymour, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 541 days.

(21) Appl. No.: 16/039,901

(22) Filed: Jul. 19, 2018

(65) Prior Publication Data

US 2020/0024975 A1 Jan. 23, 2020

(51) Int. Cl.
*F01D 5/20* (2006.01)
*F01D 5/28* (2006.01)
(Continued)

(52) U.S. Cl.
CPC ............... *F01D 5/288* (2013.01); *C09D 1/00* (2013.01); *C09D 5/00* (2013.01); *C09D 5/08* (2013.01); *C23C 28/042* (2013.01); *F01D 5/284* (2013.01); *C22C 29/06* (2013.01); *F01D 11/122* (2013.01); *F05D 2220/32* (2013.01); *F05D 2230/312* (2013.01); *F05D 2230/313* (2013.01);
(Continued)

(58) Field of Classification Search
CPC .......... F01D 5/284; F01D 5/286; F01D 5/288; F01D 11/122; F01D 11/125; C23C 28/32; C23C 28/321; C23C 28/3215; C23C 28/324; C23C 28/34; C23C 28/341; C23C 28/3455; B32B 9/005; B32B 15/043; B32B 15/16; B32B 19/041
See application file for complete search history.

(56) References Cited

U.S. PATENT DOCUMENTS 4,610,698 A  9/1986 Eaton et al.
4,680,199 A  7/1987 Vontell et al.
(Continued)

FOREIGN PATENT DOCUMENTS

DE  102006016995 A1  10/2007
EP      0573928 A1  12/1993
(Continued)

OTHER PUBLICATIONS

U.S. Final Office Action dated Jun. 3, 2020 issued for corresponding U.S. Appl. No. 16/039,907.
(Continued)

*Primary Examiner* — Ninh H. Nguyen
(74) *Attorney, Agent, or Firm* — Bachman & LaPointe, P.C.

(57) ABSTRACT

An abrasive coating for a substrate of a component in a gas path exposed to a maximum temperature of 1750 degree Fahrenheit, comprising a plurality of grit particles adapted to be placed on a top surface of the substrate; a matrix material bonded to the top surface; the matrix material partially surrounds the grit particles, wherein the grit particles extend above the matrix material relative to the top surface; a film of oxidant resistant coating applied over the plurality of grit particles and the matrix material and a thermal barrier coating material applied over said film of oxidant resistant coating.

14 Claims, 2 Drawing Sheets

(51) Int. Cl.
*C09D 1/00* (2006.01)
*C09D 5/00* (2006.01)
*C09D 5/08* (2006.01)
*C23C 28/04* (2006.01)
*C22C 29/06* (2006.01)
*F01D 11/12* (2006.01)

(52) U.S. Cl.
CPC .... *F05D 2230/90* (2013.01); *F05D 2240/307* (2013.01); *F05D 2260/231* (2013.01); *F05D 2300/134* (2013.01); *F05D 2300/172* (2013.01); *F05D 2300/2112* (2013.01); *F05D 2300/2118* (2013.01); *F05D 2300/2261* (2013.01)

(56) References Cited

U.S. PATENT DOCUMENTS

| | | | |
|---|---|---|---|
| 4,689,242 | A | 8/1987 | Pike |
| 4,741,973 | A | 5/1988 | Condit et al. |
| 4,744,725 | A | 5/1988 | Matarese et al. |
| 5,059,095 | A | 10/1991 | Kushner et al. |
| 5,453,329 | A | 9/1995 | Everett et al. |
| 5,932,356 | A | 8/1999 | Sileo et al. |
| 5,935,407 | A | 8/1999 | Nenov et al. |
| 5,952,110 | A * | 9/1999 | Schell ............... F01D 11/12 205/109 |
| 3,057,047 | A | 5/2000 | Maloney |
| 6,190,124 | B1 | 2/2001 | Freling et al. |
| 6,194,086 | B1 | 2/2001 | Nenov et al. |
| 6,468,040 | B1 | 10/2002 | Grylls et al. |
| 6,532,657 | B1 | 3/2003 | Weimer et al. |
| 6,833,203 | B2 | 12/2004 | Bose et al. |
| 7,510,370 | B2 | 3/2009 | Strangman et al. |
| 7,718,280 | B2 | 5/2010 | Wilson |
| 9,713,912 | B2 * | 7/2017 | Lee ............... C23C 30/00 |
| 9,957,826 | B2 | 5/2018 | Novikov et al. |
| 10,259,720 | B2 | 4/2019 | Balbach et al. |
| 2003/0008764 | A1 | 1/2003 | Wang et al. |
| 2004/0023020 | A1 | 2/2004 | Bose et al. |
| 2004/0208749 | A1 | 10/2004 | Torigoe et al. |
| 2005/0035086 | A1 | 2/2005 | Chen et al. |
| 2007/0099011 | A1 | 5/2007 | Wilson |
| 2008/0166225 | A1 | 7/2008 | Strangman et al. |
| 2009/0311552 | A1 | 12/2009 | Manier et al. |
| 2012/0099972 | A1 | 4/2012 | Guo et al. |
| 2013/0149163 | A1 | 6/2013 | Parkos, Jr. et al. |
| 2013/0154194 | A1 | 6/2013 | Van Saun |
| 2015/0118060 | A1 | 4/2015 | Kumar et al. |
| 2015/0354397 | A1 | 12/2015 | Novikov et al. |
| 2016/0069184 | A1 | 3/2016 | Ribic et al. |
| 2016/0069195 | A1 | 3/2016 | Hewitt et al. |
| 2016/0160661 | A1 | 6/2016 | Balbach et al. |
| 2016/0199930 | A1 | 7/2016 | Yarbrough |
| 2016/0341051 | A1 | 11/2016 | Hewitt et al. |
| 2018/0347390 | A1 | 12/2018 | Wilson et al. |
| 2020/0024971 | A1 | 1/2020 | Seymour et al. |
| 2020/0025016 | A1 | 1/2020 | Seymour et al. |

FOREIGN PATENT DOCUMENTS

| | | |
|---|---|---|
| EP | 1408197 A1 | 4/2004 |
| EP | 3056679 A1 | 8/2016 |
| EP | 3088559 A1 | 11/2016 |
| EP | 3239465 A1 | 11/2017 |
| GB | 2529854 A | 3/2016 |
| WO | 2007115551 A1 | 10/2007 |

OTHER PUBLICATIONS

European Search Report dated Dec. 18, 2019 for corresponding European Patent Application 19187387.6.
U.S. Office Action dated Nov. 18, 2019 for corresponding U.S. Appl. No. 16/039,907.
Non-Final Office Action dated Mar. 12, 2020 issued for corresponding U.S. Appl. No. 16/039,909.
European Search Report dated Apr. 1, 2020 for corresponding European Patent Application 19185773.9.
European Search Report dated Mar. 31, 2020 for corresponding European Patent Application 19185794.5.
Final Office Action dated Jun. 2, 2020 issued for corresponding U.S. Appl. No. 16/039,907.
Final Office Action dated Jul. 7, 2020 issued for corresponding U.S. Appl. No. 16/039,909.

* cited by examiner

TURBINE ABRASIVE BLADE TIPS WITH IMPROVED RESISTANCE TO OXIDATION

BACKGROUND

The present disclosure is directed to a coating layer configuration that will provide oxidation resistance to high pressure turbine blade tips and blade tip abrasives. A thin film coating is applied at the blade tip over a matrix CBN abrasive coating with matrix. In addition, a thermal barrier coating is applied over the thin film coating.

Gas turbine engines and other turbomachines have rows of rotating blades and static vanes or knife-edge seals within a generally cylindrical case. To maximize engine efficiency, the leakage of the gas or other working fluid around the blade tips should be minimized. This may be achieved by designing sealing systems in which the tips rub against an abradable seal. Generally, the tip is made to be harder and more abrasive than the seal; thus, the tips will abrade or cut into the abradable seal during those portions of the engine operating cycle when they come into contact with each other.

During the operation of a gas turbine engine, it is desired to maintain minimum clearance between the tips and corresponding abradable seals as large gap results in decreased efficiency of the turbine, due to the escape of high-energy gases. However, a small gap may increase the frequency of interaction between the tips and seal. That in turn, due to the friction between the tips and seals, will lead to excessive component wear and efficiency reduction or even component distress. Since aircraft turbines experience cyclic mechanical and thermal load variations during operation their geometry varies during the different stages of the operating cycle. Active clearance control and abrasive tips are currently used to establish and maintain optimum clearance during operation. Ideally, those tips should retain their cutting capability over many operating cycles compensating for any progressive changes in turbine geometry.

The metal matrix and/or abrasive grit in a compressor blade tip abrasive coating are prone to oxidation and/or corrosion due to normal engine operation and adverse environmental conditions. This oxidation/corrosion can lead to decreased cutting performance of the abrasive tip system against an abradable coating leading to blade damage and decrease engine performance over time. What is needed is a coating which can be applied over the blade tip abrasive coating to improve the oxidation/corrosion resistance of the abrasive coating system.

SUMMARY

In accordance with the present disclosure, there is provided an abrasive coating for a substrate of a component in a gas path exposed to a maximum temperature of 1750 degree Fahrenheit, comprising a plurality of grit particles adapted to be placed on a top surface of the substrate; a matrix material bonded to the top surface; the matrix material partially surrounds the grit particles, wherein the grit particles extend above the matrix material relative to the top surface; a film of oxidant resistant coating applied over the plurality of grit particles and the matrix material; and a thermal barrier coating material applied over the film of oxidant resistant coating.

In another and alternative embodiment, the grit particles extend above the matrix material relative to the top surface.

In another and alternative embodiment, the grit particles are flush with the matrix material relative to the top surface.

In another and alternative embodiment, the grit particles comprise a hard ceramic phase.

In another and alternative embodiment, the matrix material comprises a matrix formed from at least one of Ni, Co and MCrAlY, wherein M is Ni or Co, pure Ni and a cobalt chrome carbide material.

In another and alternative embodiment, the thermal barrier coating comprises an abradable material.

In another and alternative embodiment, the film of oxidant resistant coating is selected from the group consisting of an aluminum oxide, a zirconium oxide, a mixture of aluminum and zirconium oxide, zirconium toughened aluminum oxide.

In another and alternative embodiment, an adhesion layer is coupled to the top surface, wherein the adhesion layer is configured to adhere the grit particles to the top surface.

In accordance with the present disclosure, there is provided a turbine engine component configured for a gas path of at most 1750 degrees Fahrenheit comprising an airfoil having a tip; a composite abrasive coating bonded to the tip; the composite abrasive coating comprising an adhesion layer bonded to the tip; a layer of grit particles bonded to the adhesion layer; a matrix material coupled to the adhesion layer and connected to the grit particles; a film of oxidant resistant coating applied over the plurality of grit particles and the matrix material; and a thermal barrier coating material applied over the film of oxidant resistant coating.

In another and alternative embodiment, the first grit particles extend above the matrix material relative to the tip and/or are flush with the matrix material relative to the tip.

In another and alternative embodiment, the airfoil is a portion of the component configured for a gas path of at most 1750 degrees Fahrenheit.

In another and alternative embodiment, the film of oxidant resistant coating is selected from the group consisting of an aluminum oxide, a zirconium oxide, a mixture of aluminum and zirconium oxide, zirconium toughened aluminum oxide.

In another and alternative embodiment, the film of oxidant resistant coating has a thickness from 0.0002 inch-0.002 inch.

In another and alternative embodiment, the component is in a high pressure turbine.

In another and alternative embodiment, the thermal barrier coating thickness is about 10% to 20% of the diameter of the grit particles.

In accordance with the present disclosure, there is provided a process for coating a turbine engine airfoil with an abrasive, the process comprising applying an adhesion layer onto a tip of the airfoil, wherein the airfoil is configured to operate in a gas path having a maximum temperature of 1750 degrees Fahrenheit; adhering a plurality of grit particles to the adhesion layer, wherein spaces are formed between the grit particles; applying a matrix material to the adhesion layer and connecting to the grit particles; applying a film of oxidant resistant coating over the plurality of grit particles and the matrix material; and applying a thermal barrier coating material over the film of oxidant resistant coating.

In another and alternative embodiment, the film of oxidant resistant coating has a thickness from 0.0002 inch-0.002 inch.

In another and alternative embodiment, the film of oxidant resistant coating is selected from the group consisting of an aluminum oxide, a zirconium oxide, a mixture of aluminum and zirconium oxide, zirconium toughened aluminum oxide.

In another and alternative embodiment, the thermal barrier coating thickness is about 10% to 20% of the diameter of the grit particles.

In another and alternative embodiment, the turbine engine airfoil is part of a component in a high pressure turbine.

Other details of the coating system are set forth in the following detailed description and the accompanying drawings wherein like reference numerals depict like elements.

DETAILED DESCRIPTION

Figure 1:
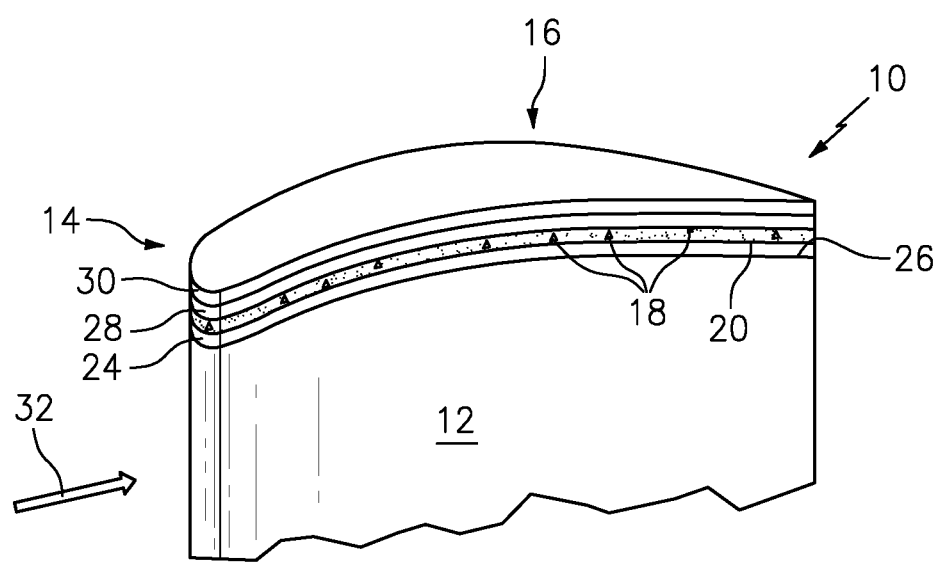
FIG. 1 is a schematic representation of abrasive composite coating applied to a tip of a turbine engine component according to the disclosure.
Figure 2:
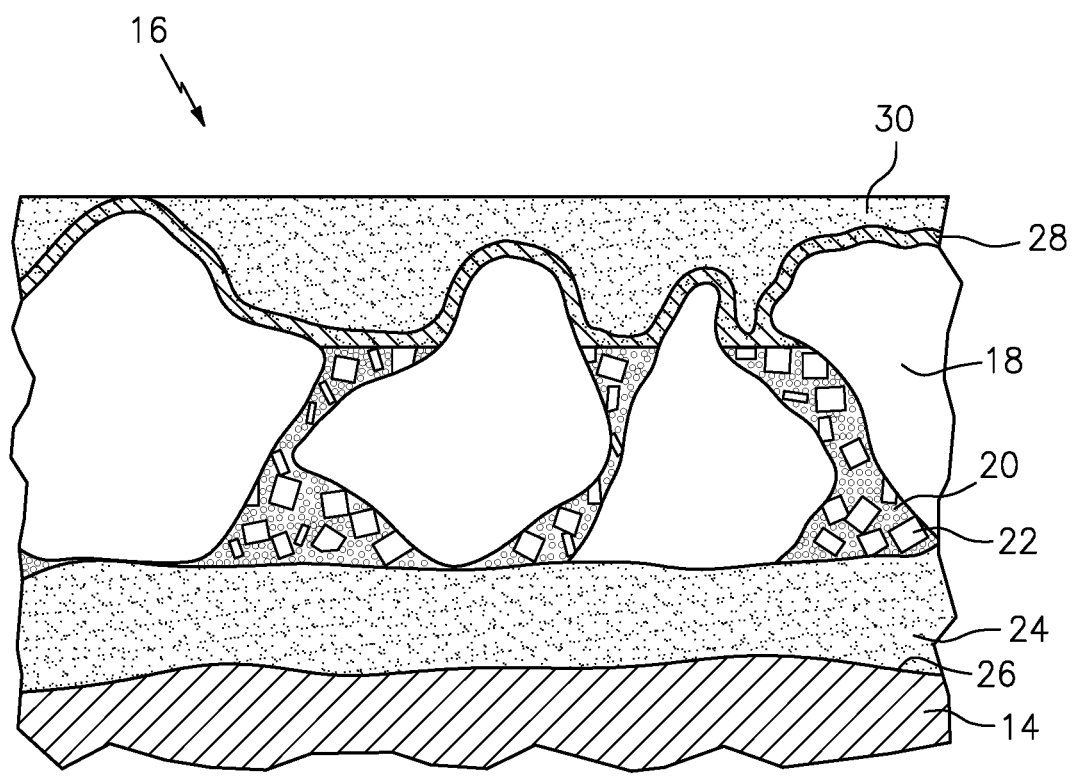
FIG. 2 is a schematic cross-sectional view of the exemplary abrasive blade tip coating.

Referring now to FIG. 1 and FIG. 2 there is illustrated a turbine engine component 10, such as a gas turbine blade including but not limiting to a high pressure turbine airfoil. The turbine blade 10 has an airfoil portion 12 with a tip 14. The tip 14 has an abrasive coating 16 applied to it. The abrasive coating 16 comprises a corrosion resistant composite material. The abrasive coating includes an abrasive particulate/grit or first grit, simply grit 18, such as cubic boron nitride (CBN), coated silicon carbide (SiC), or another hard ceramic phase. In an exemplary embodiment, the coated silicon carbide can be coated with alumina.

The grit 18 can be sized as a coarse grit. In an exemplary embodiment the grit 18 can be sized from about 40 to about 1000 microns. The first grit 18 is embedded in a layer matrix composite or simply matrix layer 20. The matrix layer 20 comprises a suitable oxidation-resistant alloy matrix.

In an exemplary embodiment the matrix layer 20 comprises a matrix formed from Ni, Co, or MCrAlY, the M standing for either Ni or Co or both. In an exemplary embodiment, the matrix layer 20 can comprise pure nickel, nickel alloy, copper, copper alloy, cobalt, cobalt alloy, chrome, a nickel chrome carbide material or other alloys.

A second grit 22 can be interspersed between the first grit 18. The second grit 22 is a smaller sized particle than the larger first grit material 18. Second grit 22 are placed within the matrix layer 20 in one or more layers. The resulting blade tip 14 with abrasive coating 16 is particularly well suited for rubbing metal as well as ceramic abradable seals (not shown).

The abrasive coating 16 includes the large first grit 18. In an exemplary embodiment, the abrasive coating 16 can also include relatively smaller second grit 22 interspersed throughout the matrix layer 20.

The abrasive coating 16 can include an adhesion layer or simply a base layer 24 bonded to a top surface 26 of the blade tip 14. The adhesion layer 24 is configured to adhere the grit particles to the top surface 26. The adhesion layer 24 can be the same material as the matrix layer 20. The adhesion layer 24 can be from about 1 to about 100 microns in thickness. In an exemplary embodiment, the adhesion layer 24 can be from about 25 to about 50 microns in thickness. The adhesion layer 24 can be optionally applied, so that the matrix layer 20 is bonded to the top surface 26 of the tip 14. In an exemplary embodiment, in the turbine application a diffusion heat treat of 1975 degrees Fahrenheit is used for 2 hours under vacuum to improve bonding between layers and diffuse constituents. Those constituents may be the alloying elements included as particles in a pure Ni plate matrix. The diffusion process causes the alloy to form.

In an exemplary embodiment the first grit particles 18 extend above the matrix material 20 relative to the top surface 26. In an exemplary embodiment the first grit particles 18 are flush with the matrix material 20 relative to the top surface 26.

A film of oxidant resistant coating 28 can be applied over the grit particles 18, 22 and the matrix material 20. The film of oxidant resistant coating 28 can comprise an oxide coating. The film of oxidant resistant coating 28 can conform to the profile shape of the matrix material 20 and grit particles 18. In an exemplary embodiment, the film of oxidant resistant coating 28 can be selected from the group consisting of an aluminum oxide, a zirconium oxide, a mixture of aluminum and zirconium oxide, zirconium toughened aluminum oxide, and the like. The film of oxidant resistant coating 28 has a thickness from 0.0002 inch-0.002 inch. The film of oxidant resistant coating 28 is configured to protect said matrix material from oxidation/corrosion by acting as a barrier for oxygen diffusion to the matrix layer 20 and/or grit 18, 22 of the abrasive coating 16. The film of oxidant resistant coating 28 can also prevent corrosive species from coming into contact with the abrasive coating 16.

The film of oxidant resistant coating 28 can be applied using a cathodic-arc physical vapor deposition (PVD) or variations thereof.

In an exemplary embodiment, a thermal barrier coating (TBC) 30 layer can be applied over the film of oxidant resistant coating 28. The TBC 30 in this embodiment can possess unique characteristics due to the location on the tip 14. The TBC 30 can be quite soft and have a combination of abradable and TBC properties. The abradable nature of the TBC 30 can preserve the cutting ability of the grits 18. The TBC 30 layer will need to be either thin, at less than the height of the grits above the matrix, or abradable with cohesive strength on the order of 250 to 1000 pounds per square inch.

The TBC 30 may be either thin with a thickness less than the protrusion height of the abrasive above the matrix or it may be thicker and substantially fill the spaces between protruding grits in addition to covering some or all of the grits 18. In the form of a thin TBC, spaces will be left between protruding grits to accommodate the wear debris and allow it to be expelled without causing significant frictional heating of the tip. In an exemplary embodiment, the spaces cab be at least half the area at the cutting surface (grit tip height) that is left open.

The thin TBC's thickness is about 10% to 20% of the diameter of the grit 18. At this relatively thin dimension, the TBC needs to be relatively denser and stronger than a thicker version. The thin TBC may be dense zirconia, hafnia, yttria, alumino-silicates, etc. Preferred deposition methods include physical vapor deposition, powder plasma spray, powder HVOF, suspension plasma spray, solution plasma spray, slurry based coatings, among other methods. The resultant TBC coating may be fully dense and approach the hardness and modulus of the fully dense material and depending on the deposition process may have strength as low as 3000 psi. As a thin layer, a minimum strength of 3000 psi ensures sufficient erosion resistance for the TBC to survive and protect the tip during service.

In contrast to the thin TBC version, the thick TBC is required to abrade away during contact with the outer air seal material so that the abrasive particles may effectively cut the outer air seal. The thick TBC must also wear differentially to the abrasive particles so that there is some relief in the tip surface to allow the wear particles to be ejected. In order to achieve this condition, the thick TBC must be of approximately equal strength to the outer air seal material or of lower strength. At equal strength the smaller surface area of a blade tip compared with the outer air seal, called the solidity ratio, the blade tip TBC will be worn sufficiently to allow effective cutting, wear particle ejection and limited temperature rise during rub. While ceramic outer air seals tend to be in the 1000 to 3000 psi strength range, the thick tip TBC is between 250 and 3000 psi and preferably between 250 and 1000 psi in strength.

This provides sufficient durability to erosion under operating conditions while allowing sufficient wear so that the abrasive cuts efficiently. The thick TBC may be porous zirconia, hafnia, yttria, alumino-silicates, etc. The exemplary deposition methods include physical vapor deposition, powder plasma spray, suspension plasma spray, solution plasma spray, slurry based coatings, among other methods.

In an exemplary embodiment, the TBC layer 30 may be applied by any conventional manner. In an exemplary embodiment, a cost effective method can include extensions of the film oxidant resistant coating 28 deposition or TBC 30 deposition. Examples can include a modification of material composition or parameters during suspension plasma spray (SPS) and the natural off angle deposition of electron beam physical vapor deposition (EBPVD) of the TBC 30 on the tip 14 region. Another exemplary embodiment can include post processing to selectively remove some of the soft TBC 30 thickness. This removal can be beneficial to achieve the correct soft TBC 30 thickness after passive application during EBPVD or for exposing abrasive particles after a general application process.

The component 10 can include a component in a gas path 32 exposed to a temperature of 2500 degrees Fahrenheit or higher. In many applications, the airfoils used in the high turbine section of the engine are cooled by air flowing through internal cooling passages. The cooled blades may have metal temperature at their tips of about 2300 degrees Fahrenheit. That temperature may vary depending on TBC characteristics and operating conditions. In an exemplary embodiment the component can be in a high pressure turbine, such as a high pressure turbine blade.

The addition of the film of oxidant resistant coating to the abrasive coating provides the advantage of retaining cutting ability for the abrasive tip system against an abradable air seal. Thus, maintaining the optimum clearance between the blade and the air seal. The improved capacity to resist oxidation/corrosion for the blade tip abrasive coating will provide the advantage of improved durability of the blade tips that may currently merely provide marginal durability.

There has been provided a coating system. While the coating system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:
1. An abrasive coating for a substrate of a component in a gas path exposed to a maximum temperature of 1750 degrees Fahrenheit, comprising:
a plurality of grit particles adapted to be placed on a top surface of said substrate;
a matrix material bonded to said top surface; said matrix material partially surrounds said grit particles, wherein said grit particles extend above said matrix material relative to said top surface;
a film of oxidant resistant coating applied over said plurality of grit particles and said matrix material, said film of oxidant resistant coating consisting of a mixture of aluminum and zirconium oxide; and
a thermal barrier coating material applied over said film of oxidant resistant coating.

2. The abrasive coating for a substrate of a component in a gas path exposed to a maximum temperature of 1750 degrees Fahrenheit according to claim 1, wherein said grit particles comprise a hard ceramic phase.

3. The abrasive coating for a substrate of a component in a gas path exposed to a maximum temperature of 1750 degrees Fahrenheit according to claim 1, wherein said matrix material comprises a matrix formed from at least one of Ni, Co and MCrAlY, wherein M is Ni or Co, pure Ni and a cobalt chrome carbide material.

4. The abrasive coating for a substrate of a component in a gas path exposed to a maximum temperature of 1750 degrees Fahrenheit according to claim 1, wherein said thermal barrier coating comprises an abradable material.

5. The abrasive coating for a substrate of a component in a gas path exposed to a maximum temperature of 1750 degrees Fahrenheit according to claim 1, further comprising:
an adhesion layer coupled to said top surface, wherein said adhesion layer is configured to adhere said grit particles to said top surface.

6. A turbine engine component configured for a gas path of at most 1750 degrees Fahrenheit comprising:
an airfoil having a tip;
a composite abrasive coating bonded to said tip;
said composite abrasive coating comprising an adhesion layer bonded to said tip;
a layer of grit particles bonded to said adhesion layer;
a matrix material coupled to said adhesion layer and connected to said grit particles;
a film of oxidant resistant coating consisting of a mixture of aluminum and zirconium oxide applied over said plurality of grit particles and said matrix material; and
a thermal barrier coating material applied over said film of oxidant resistant coating.

7. The turbine engine component configured for a gas path of at most 1750 degrees Fahrenheit according to claim 6, wherein said airfoil is a portion of said component configured for a gas path of at most 1750 degrees Fahrenheit.

8. The turbine engine component configured for a gas path of at most 1750 degrees Fahrenheit according to claim 6, wherein said film of oxidant resistant coating has a thickness from 0.0002 inch-0.002 inch.

9. The turbine engine component configured for a gas path of at most 1750 degrees Fahrenheit according to claim 6, wherein said thermal barrier coating thickness is about 10% to 20% of the diameter of the grit particles.

10. The turbine engine component configured for a gas path of at most 1750 degrees Fahrenheit according to claim 6, wherein said component is in a high pressure turbine.

11. A process for coating a turbine engine airfoil with an abrasive, said process comprising:
applying an adhesion layer onto a tip of said airfoil, wherein said airfoil is configured to operate in a gas path having a maximum temperature of 1750 degrees Fahrenheit;
adhering a plurality of grit particles to said adhesion layer, wherein spaces are formed between said grit particles;

applying a matrix material to said adhesion layer and connecting to said grit particles;

applying a film of oxidant resistant coating consisting of a mixture of aluminum and zirconium oxide over said plurality of grit particles and said matrix material; and applying a thermal barrier coating material over said film of oxidant resistant coating.

12. The process of claim 11, wherein said film of oxidant resistant coating has a thickness from 0.0002 inch-0.002 inch.

13. The process of claim 11, wherein said thermal barrier coating thickness is about 10% to 20% of the diameter of the grit particles.

14. The process of claim 13, wherein said turbine engine airfoil is part of a component in a high pressure turbine.

* * * * *